United States Patent Office 3,271,334
Patented Sept. 6, 1966

3,271,334
PROCESS FOR THE PRODUCTION OF CROSS-LINKED COMPOUND POLYMERS OF POLYACROLEIN
Werner Kern, Rolf Schulz, and Irmela Löflund, Mainz (Rhine), Germany, assignors to Deutsche Gold- und Silber-Scheideanstalt vormals Roessler, Frankfurt am Main, Germany
No Drawing. Filed Sept. 4, 1963, Ser. No. 306,611
Claims priority, application Germany, Oct. 4, 1958, D 29,076
9 Claims. (Cl. 260—8)

This application is a continuation-in-part of application Serial No. 843,909, filed October 2, 1959, now abandoned.

The present invention relates to a novel process for the production of cross-linked compound polymers of polyacrolein.

So-called "grafted" polymerizates have been known to the art for some time. These "grafted" polymers are so constructed that the macromolecule consists, in part, of relatively long, side chains built up from one or more foundation units which are different from the foundation units of the principal chain. Polymers of this type distinguish themselves notably from other polymers by virtue of their special, significant technical properties. Various procedures have been devised for the production of these "grafted" polymers. These procedures, however, are involved and entail either inducing side chain forming monomers to polymerize in the presence of another, already preformed, polymer which serves as a principal chain and to which the polymerizing monomers will attach themselves, or, joining by suitable chemical or physical methods side chain macromolecules, which are produced in a separate reaction, with another macromolecule which is also separately produced and which serves as the principal chain. In both cases in the production of these "grafted" polymers the side chains are combined with the principal chain only by one or very few principal valence linkages per molecule of the principal chain.

The present invention relates to a novel process for the production of a variation of a type of these "grafted" polymers, that is, cross-linked compound polymers. The cross-linked compound polymers contemplated according to the invention are in general somewhat similar to the above mentioned "grafted" polymers. However, there is a basic distinction between them in that the cross-linked compound polymers produced by the novel process of this invention are composed of macromolecular components which are linked with one another by very many, usually at least more than four, linkages or cross-linkages. In this way an intimately interwoven molecular structure is attained. The cross-linkage are created by chemical reactions. Both components must be polymeric materials each macromolecule of which possesses more than four reactive groups. The invention relates therefore to the reaction between two or more macromolecular materials which contain reactive groups. The cross-linked compound polymers according to the invention are produced by the reaction of macromolecular homopolymerization productions of acrolein (hereafter called Compound A) with at least one other polymer (hereafter called Compound B) which must contain, per macromolecule, more than four reactive groups which are able to react with aldehyde groups.

These Compound A polymers are all macromolecular homopolymerization products of acrolein which contain, along a paraffin type principal chain, a large number of reactive carbonyl groups, which may also be in a masked form, and are produced with free radical polymerization catalysts, preferably of the redox type. Such homopolymers are infusible and insoluble in organic solvents. According to the invention, however, they are employed as aqueous solutions in the form of their adducts with sulfurous acid. The macromolecular homopolymers of acrolein concerned according to the invention have molecular weights of the order of 10,000 and higher (see Staudinger in Zeit. f. Angew. Chemie 49, page 802, 1936, and Staudinger, Makromolekulare Chemie & Biologie, page 6, 1947, Basel).

The polymeric materials (Compound B) which are reacted with the homopolymerization products of acrolein (Compound A) as contemplated according to the invention include all natural or synthetic polymers which contain groups which will react with carbonyl groups. These carbonyl reactive groups include, in particular, OH—, SH—, $NH_2$—, NH—, $NH_2$—NH— groups or activated $CH_2$— groups. Various combinations of these groups can be simultaneously present in one such polymer (Compound B). Examples of such Compound B materials within the scope of this invention are cellulose, starch, alginic acid, pectin, polyvinyl alcohol, polyethylene imine, collagen, gelatine, albumin, globulin, wool, especially that type of woolen goods which are known by the tradename or trademark Moreno, which are produced, as is commonly known, using animal hides as the starting material, lignin, natural or synthetic casein, particularly also keretin, proteins and the like.

In addition, inorganic polymers, such as polymeric silicic acid, for example in the form of a silica gel or the trademarked goods Aerosil, and the like, can also be used as a Compound B polymer within the scope of this invention.

If the required reactive groups are not present in the Compound B polymers prior to when these polymers are to be reacted with the Compound A polymers they can nevertheless still be added before this reaction, for example, by converting an ester group into a hydrazide group, by reducing a nitro group to an amino group, and the like.

Considering these possibilities, the selection of polymers for use as Compound B polymers within the scope of this invention can be made from an even much greater area of choice.

The process of this invention can be so conducted, that in addition to Compound A polyacrolein being in solution, the Compound B polymers can be used in a dissolved form. The solvent or solvents used for this purpose must be such as will not inactivate the reactive groups of both Compounds A and B.

The polyacrolein solution employed according to the invention can, for example, be formed in the following manner. At the termination of the polymerization reaction by which the Compound A polyacrolein is formed and which, if desired, is conducted in the presence of water and emulsifiers, sufficient quantities of sulfur dioxide, in gaseous form, are introduced into the polyacrolein reaction mixture and the mixture is stirred at room temperature until the Compound A polyacrolein dissolves in the aqueous sulfurous acid. It is also possible, instead of $SO_2$ in gaseous form, to introduce an aqueous solution of alkali bisulfite into the polyacrolein mixture and to acidify this solution to a $p_H$ of 1 to 5. The entire mixture can then be reacted with the Compound B polymers.

It is known that polyacrolein polymers react with sodium bisulfite to give water soluble addition compounds from which the aldehydes may be regenerated with either acid or alkali (U.S. Patent 2,657,192). The acidified bisulfite mixture with the regenerated polyacrolein is not able to react with other macromolecular materials.

It is also possible to dissolve Compound B in a different solvent, other than an aqueous medium such as used for Compound A and even though the two solvents that are used are not miscible with one another, the reaction between the two compounds will still proceed at the interface between the two systems.

If the presence of sulfurous acid is disturbing because sensitive Compound B polymers are being used it can be removed by dialysis, ion exchange or autoxydation. When the sulfurous acid is completely removed from the aqueous solution of Compound A polyacrolein, the polyacrolein does not revert to an undissolved form but remains in solution in a particularly reactive but stable hydrate form.

The proportional quantities, of each of the two reactant Compounds A and B to be used, can be varied in each case over wide ranges of concentrations depending on the intended use that is to be made of the final product. It is sufficient to add even less than 1% polyacrolein as Compound A in order to obtain measurable changes in the properties of the other Compound B polymer components. Although the quantities in which the Compounds A and B are used, are not limited, they are preferably used in a ratio of from about 1:3 to about 1:50, in case the components A and B are both used in the dissolved state.

A particular advantage of the cross-linked compound polymers produced according to the invention is that they can still contain a large number of reactive aldehyde groups. These reactive aldehyde groups can subsequently be subjected to further chemical reactions with such compounds as will react with aldehyde groups, as, for example, were described in German Patent 1,016,020.

The presence of the aldehyde groups in the cross-linked compound polymers produced according to the invention can be qualitatively proven with known carbonyl detecting reagents, for example, these compound polymers become colored to a more or less intense blue color when treated with fuchsin-sulfurous acid depending on their aldehyde group content. When treated with alkaline benzosulfo hydroxamic acid, the aldehyde groups are converted into hydroxamic acid groups, which when treated with iron III chloride solutions yield red brown colored polymeric complex salts.

The chemical, physical and technical properties of common polymers can be extensively modified by the process of this invention as well as by the subsequent reactions to which aldehyde groups remaining in the cross-linked polymers can be subjected to. This technique has opened up broader and new possibilities in the different fields of use of polymers, as, for example, in the production of films, lacquers, textiles, adhesives, paper, gum and the like. In addition, the cross-linked compound polymers can be used as hair grooming agents or as additional components in known hair treating agents.

The new cross-linked compound polymers produced according to the invention display properties which are not evident in either or both of the component compounds, A and B.

It is advantageous to conduct the process according to the invention in an acid medium at temperatures of 0–200° C., but preferably at room temperature.

The following examples are illustrative of the process of the invention but are not intended as a limitation upon its scope.

EXAMPLE 1

(a) *Production of a polyacrolein-sulfurous acid solution (Compound A) according to the invention.*—Gaseous sulfur dioxide was introduced into distilled water at 20° C. until an 8% solution of sulfurous acid was formed. 10 parts of this 8% sulfurous acid solution were added to 1 part polyacrolein which was produced by a redox polymerization of acrolein in an aqueous medium with the aid of a redox system composed of potassium persulfate and silver nitrate. The mixture was allowed to stand at room temperature. It immediately formed a viscous jelly mass which turned into a viscous solution in the course of 24 hours. Small amounts of undissolved components were then separated.

EXAMPLE 2

25 parts of an aqueous 15% polyvinyl alcohol solution (Compound B) were mixed at room temperature with 8 parts of a 10% polyacrolein-sulfurous acid solution (Compound A) produced as in Example 1. The mixture was stirred well and using well known techniques was poured out to form a film. The poured solution congealed to a jelly and after being dried the film was stretchable. This film was insoluble in boiling water, acids and caustic. The presence of aldehyde groups were ascertained both by the color reaction with fuchsin-sulfurous acid as well as by the Angeli-Rimini reaction.

The stretchability and tensile strength of this film depends on the mol weights of polyvinyl alcohol and polyacrolein employed in the mixture of the two compounds. As the polyacrolein content increases the stretchability of the final film product decreases and the tensile strength increases. With a 30% acrolein content the tensile strength of the film produced was about three times as great as when a 1% polyacrolein content was used.

EXAMPLE 3

A 10% solution of gelatine (Compound B) was poured out onto glass plates and allowed to dry at room temperature. The gelatine filmed glass plates were put in a water bath at room temperature for ½ hour and were then placed in a mixture of 5 parts of a 10% polyacrolein-sulfurous acid solution (Compound A) (as produced in Example 1) and 5 parts of water for ½ hour at room temperature. The film was washed off and dried at room temperature. Tests with fuchsin-sulfurous acid reagent indicated that the polyacrolein had only reacted with the gelatine on the surface of the film coating. The gelatine film thus produced was insoluble in water.

EXAMPLE 4

Cellulose (Compound B) was mercerized with 20% sodium hydroxide for 15 minutes at room temperature. It was then washed with water and dilute acetic acid after which it was mixed with a 10% polyacrolein-sulfurous acid solution (Compound A) (produced as in Example 1). This mixture was held at room temperature for 24 hours. After this reaction period the mixture was washed with water until the wash water was free of sulfur dioxide. Aldehyde groups were thereby fixed on the cellulose thus treated and the presence of these groups was ascertainable by the customary tests, such as the use of fuchsin-sulfurous acid reagent.

The mercerization can also be conducted using weaker caustic solutions and correspondingly longer reaction times.

EXAMPLE 5

A film of natural protein composed of beef tendon collagen (Compound B) was first washed with water and then shaken for 20 hours at room temperature with a mixture of 20 parts of a 10% polyacrolein-sulfurous acid solution (Compound A) (produced as in Example 1) and 20 parts of water. After the film was washed with water to free it of sulfur dioxide its fixed aldehyde group content was qualitatively detected using the fuchsin-sulfurous acid reagent. The shinking temperature of the treated film was 72–75° C. The untreated film had a shrinking temperature of 42–45° C.

Aqueous solutions of albumin or globulin (Compound B) when mixed with polyacrolein-sufurous acid solutions (Compound A) under the same test conditions as used above in this example, yielded insoluble precipitates at once. This was also the case when solutions of polyethylene imine were mixed with the polyacrolein-sulfurous acid solutions.

EXAMPLE 6

Fine particle sized polymeric silicic acid (trademark Aersil produced by vapor phase decomposition of silicon tetrachloride in a flame with combustible hydrogen containing gases) (Compound B) which was in the form of an aerogel was triturated to a thick paste with a small quantity of a 10% polyacrolein-sulfurous acid solution (Compound A) (as produced in Example 1) and the mixture was allowed to stand at room temperature for 24 hours. The mixture was then diluted with water and the silicic acid was separated by the use of a centrifuge. The silicic acid in turn was washed with water until the wash water was free of sulfur dioxide. Upon the addition of fuchsin-sulfurous acid reagent the silicic acid became deep blue in color. The reagent solution itself remained completely colorless indicating that the polyaldehyde was firmly affixed to the silicic acid.

The same reaction can also be conducted with silica gel.

EXAMPLE 7

A 5–10% aqueous solution of polyacrylic acid hydrazide (Compound B) was reacted with an about 10% polyacrolein-sulfurous acid solution (Compound A) at room temperature. A white precipitate formed at once, which was insoluble in all solvents.

The polyacrylic acid hydrazide was produced in the following manner. 5 g. of the finest possible comminuted polyacrylic acid ester were heated on a boiling water bath with 50 g. of hydrazine hydrate, until a homogeneous solution was obtained (about 2½ hours), which was then in turn poured into 500 cc. of methanol which contained 1 cc. of glacial acetic acid. The raw product was dissolved in 50 cc. of water and reprecipitated in methanol. After being removed by suction the precipitated polyacrylic acid hydrazide was washed with methanol and dried in a vacuum over sulfuric acid.

EXAMPLE 8

When the presence of excess sulfurous acid is disturbing to reactions between the polyacrolein-sulfurous acid solution and sensitive polymers (Compound B) it was removed by the following techniques:

(a) The polyacrolein-sulfurous acid solution was placed in a dialysis tube and dialysed against distilled water. The dialysis was continued until no more sulfurous acid could be detected in the dialysate.

(b) 100 cc. of a 10% polyacrolein-sulfurous acid solution (produced as in Example 1) were treated with about 100 g. of a weak basic anion exchanger. Condensation products of phenol derivatives, formaldehyde and aliphatic amines are suitable for this purpose, for example, Amberlite IR–4B produced by Rohm and Haas Corporation.

The techniques of (a) or (b) produced polyacrolein solutions from which only the excess $SO_2$ had been removed.

(c) For a complete separation of the $SO_2$ it was necessary to further subject the polyacrolein-sulfurous acid solutions to an autoxydation treatment. After the polyacrolein-sulfurous acid solution had first been subjected to a dialysis or anion exchange treatment to remove the excess $SO_2$ it was then shaken with oxygen at 50° C. after ferric nitrate had been added as a catalyst (10 mg.

$$Fe(NO_3)_3 \cdot 9H_2O$$

per 10 g. of polyacrolein). This procedure caused an autoxydation of the $SO_2$, while at the same time the polyacrolein remained unaffected in solution in a hydrated form. In the course of the about 2-day autoxydation treatment a strong foaming occurred, which was repressed with the aid of an antifoaming agent (for example, a silicon-antifoam emulsion). The termination of the autoxydation was indicated when no more sulfurous acid was detectable. In order to remove the sulfuric acid formed during the autoxydation a weak basic anion exchanger was employed as described under (b), above.

The aqueous, $SO_2$-free polyacrolein solution was clear, light yellow in color, ordorless and stable for months at a time and it can be used in the same manner as described in the examples above.

EXAMPLE 9

The presence of unreacted aldehyde groups was detected in the cross-linked compound polymers produced by this novel process by the color reaction induced with the use of fuchsin-sulfurous acid.

The cross-linked compound polymer produced in Example 5 from the beef tendon collagen and polyacrolein-sulfurous acid solution was suspended in fuchsin-sulfurous acid reagent. The aldehyde groups present in the cross-linked compound polymer reacted with this reagent and yielded a bright blue-violet colored material, the color of which was chemically combined with the polymer and could not be washed off.

EXAMPLE 10

The unreacted aldehyde groups present in the cross-linked compound polymers produced by the process of the invention can be further reached chemically. They can be converted, for example, into hydroxamic acid groups as was demonstrated by the following procedure.

The cross-linked compound polymer produced in Example 2 was mixed with an alcoholic solution of benzosulfo hydroxamic acid. After this about ½ cc. of 2 N sodium hydroxide was added with cooling and agitation and the mixture was allowed to stand at room temperature for 15 minutes. The unreacted aldehyde groups present in the cross-linked compound polymer were thus transformed into hydroxamic acid groups. These hydroxamic acid groups can be detected by an intense red coloration which occurs upon acidification with dilute hydrochloric acid and the addition of ferric chloride solution.

When silica gel or the trademarked material Aerosil have been used as Compound B, the products can be used as filter which additionally shows the properties of the polyacrolein.

The stretchable film which has been produced according to Example 2 can be used as transparent packing material.

EXAMPLE 11

(a) *Production of an acidified polyacrolein-bisulfite solution (Compound A) according to the invention.*—35 cc. of water were added to 3.5 g. polyacrolein (which was produced by a redox polymerization of acrolein in an aqueous medium with the aid of a redox system composed of potassium persulfate and silver nitrate) and 5 g. of $Na_2S_2O_7$. The mixture was heated at 50° C. for 4 hours. 10 cc. of a 2 normal solution of hydrochloric acid were then added to the limpid solution. The $p_H$ of the mixture was 1.

(b) 40 cc. of an aqueous 15% polyvinyl alcohol solution, Compound B) were mixed with 12 cc. of an acidified polyacrolein bisulfite solution (Compound A) produced according to Example 11a and the mixture was poured on a glass slide to form a film. After 24 hours at room temperature the film was stripped; it is capable of swelling up, but insoluble in cold or boiling water. The presence of aldehyde groups which did not cross-link with Compound B was ascertained by the color reaction with fuchsin-sulfurous acid.

EXAMPLE 12

(a) *Production of an acidified polyacrolein-bisulfite solution (Compound A) according to the invention.*—10 cc. of a 2 normal solution of sulfuric acid were added to a polyacrolein-bisulfite solution corresponding to Example 11a. The $p_H$ of the mixture was 1.

(b) 40 cc. of an aqueous 15% polyvinyl alcohol solution produced according to Example 11b were mixed with 12 cc. of an acidified polyacrolein-bisulfite solution corresponding to Example 12a and a film was poured in the same manner as in Example 11b. Its properties were the same as the properties of the film obtained according to Example 11b.

EXAMPLE 13

An albuminous substance in form of a foil produced from sinew collagen was immersed into the polyacrolein-bisulfite solution corresponding to Example 12a for 10 hours at room temperature. Then the foil was washed with water for 24 hours and dried. The aldehyde groups of the polyacrolein were thereby chemically bound on the surface of the collagen and were ascertained by the color reaction with fuchsin-sulfurous acid. A foil which was not treated with the acidified polyacroleinbisulfite solution had no color reaction with fuschin-sulfurous acid.

We claim:
1. A process for the production of cross-linked compound polymers which comprises reacting an infusible macromolecular homopolymer of acrolein having a molecular weight of at least 10,000 produced in the presence of a free radical polymerization catalyst dissolved in an acid aqueous solution of sulfurous acid having a pH between 1 and 5 with a polymeric compound selected from the group consisting of natural and synthetic polymeric compounds which are macromolecular and contain more than four groups per macromolecule which are reactive with aldehyde groups selected from the group consisting of OH, SH, $NH_2$, NH, $NH_2$—NH and activated $CH_2$ groups at a temperature between 0° and 200° C.

2. The process of claim 1 in which said homopolymer of acrolein was produced in the presence of a redox polymerization catalyst.

3. The process of claim 1 in which said polymeric compound is also used in dissolved form.

4. The process of claim 1 in which said polymeric compound is in solid form.

5. A process as in claim 1 in which excess $SO_2$ is removed from said homopolymer of acrolein solution before said reaction.

6. A process as in claim 1 in which said acid aqueous solution of sulfurous acid contains ions of alkali metals.

7. A process as in claim 5 further comprising removing all $SO_2$ from said homopolymer of acrolein solution before said reaction, said homopolymer of acrolein being rendered thereby into a stable reactive hydrate form.

8. The product of a reaction of an infusible macromolecular homopolymer of acrolein having a molecular weight of at least 10,000 produced in the presence of a free radical polymerization catalyst dissolved in an aqueous solution of sulfurous acid having a pH between 1 and 5 with a polymeric compound selected from the group consisting of natural and synthetic polymeric compounds which are macromolecular and contain more than four groups per macromolecule which are reactive with aldehyde groups selected from the group consisting of OH, SH, $NH_2$, NH, $NH_2$—NH and activated $CH_2$ groups at a temperature between 0° and 200° C.

9. A process for the production of cross-linked compound polymers which comprises reacting an infusible macromolecular homopolymer of acrolein, having a molecular weight of at least 10,000 produced in the presence of a free radical polymerization catalyst, dissolved in an acid aqueous solution of sulfurous acid having a pH between 1 and 5 with a polymeric compound which is macromolecular and contains more than four groups per macromolecule which are reactive with aldehyde groups selected from the group consisting of cellulose, starch, alginic acid, pectin, polyvinyl alcohol, polyethylene imine, proteins, lignin and polymeric silicic acid at a temperature between 0° and 200° C. in a proportion of about 1 part by weight of dissolved acrolein polymer per 3 to 100 parts by weight of the polymeric compound containing the groups which are reactive with aldehyde groups.

References Cited by the Examiner

UNITED STATES PATENTS

| 2,657,192 | 10/1953 | Miller et al. | 260—67 |
| 3,030,319 | 4/1962 | Kaizerman et al. | 260—17.4 |

FOREIGN PATENTS

| 1,082,408 | 5/1960 | Germany. |

SAMUEL H. BLECH, *Primary Examiner.*

WILLIAM H. SHORT, *Examiner.*

L. M. MILLER, *Assistant Examiner.*